United States Patent [19]
Onitsuka

[11] Patent Number: 5,501,005
[45] Date of Patent: Mar. 26, 1996

[54] MOUNTING DEVICE OF ELECTRONIC COMPONENTS AND A MOUNTING METHOD

[75] Inventor: Yasuto Onitsuka, Fukuoka, Japan

[73] Assignee: Matsushita Electric Industrial Co., Ltd., Osaka, Japan

[21] Appl. No.: 313,595

[22] Filed: Sep. 29, 1994

[30] Foreign Application Priority Data

Sep. 30, 1993 [JP] Japan ................................ 5-244539

[51] Int. Cl.⁶ .............................. H05K 3/30; H05K 3/34; B23P 19/00; G07F 11/66
[52] U.S. Cl. ..................... 29/833; 29/832; 29/840; 29/721; 29/741; 29/759; 29/564.2; 29/566.1; 221/25; 221/74
[58] Field of Search ..................... 29/832, 833, 840, 29/740, 741, 759, 564.2, 564.7, 566.1, 566.2, 566.3, 721; 221/25, 30, 74

[56] References Cited

U.S. PATENT DOCUMENTS 4,850,780 7/1989 Safabakhsh ........................... 221/74
5,027,505 7/1991 Nakamura et al. ..................... 29/412
5,342,460 8/1994 Hidese ................................. 29/740

Primary Examiner—P. W. Echols
Attorney, Agent, or Firm—Willian Brinks Hofer Gilson & Lione

[57] ABSTRACT

In an apparatus for mounting electronic components, punched out from film carriers to a substrate, there is disclosed an upper die for punching the electronic components through a hole formed in a lower die. A take out nozzle is located under the through hole for sucking the punched out electronic component from the hole in the lower die. A transfer nozzle is provided for receiving the electronic component from the take out nozzle and for transmitting the electronic component to a substrate mounted on a movable table. Before any leadwires of the component are bonded to the electrodes of the substrate, the table is finely positioned to property align the leadwires and the electrodes.

12 Claims, 8 Drawing Sheets

MOUNTING DEVICE OF ELECTRONIC COMPONENTS AND A MOUNTING METHOD

BACKGROUND OF THE INVENTION

This invention relates to an apparatus and method for mounting electronic components made by punching out the components bonded on film carriers to, for example, a liquid crystal display panel.

A display panel of liquid crystal is fabricated by connecting the leadwires of an electronic component to electrodes which are on the periphery of the display panel. The electronic components are made by stamping out the electronic components bonded on film carriers. This method is called TAB method (tape automated bonding method). FIGS. 8(a)–8(c) depict a conventional method for punching out electronic components.

In FIG. 8(a), there is shown an electronic component in the form of a chip 2 and leadwires (not shown) bonded on a film carrier 1 supplied from a supply reel (not shown). An upper die 3 has a punch 4, while a lower die 5 has a knock-out pin 6. A film carrier 1 is wound up by a take up reel (not shown) and progresses intermittently between the upper die 3 and the lower die 5. In FIG. 8(a) the film carrier 1 is stopped with the chip 2 between the punch 4 and the knock-out pin 6.

In FIG. 8(b), the upper die 3 is lowered to punch the film carrier 1. The knock-out pin 6 is pushed by the punch 4 and is lowered against an upward supporting force of a spring (not shown).

In FIG. 8(c), the upper die 3 is raised. The knock-out pin 6, with the punched electronic component 7 on it, is raised also by a mechanism (not shown). A removing device 8 with a take out nozzle 9 is inserted between the upper die 3 and the lower die 5 to suck up the electronic component 7.

As shown in FIG. 8(c), the upper die 3 has to move with long strokes in order to provide a clearance in which the take out nozzle 9 can be inserted. The distance of each of the strokes prolongs the fabrication time of the process by making the upper die 3 move in longer strokes than if the take out nozzle did not have to be inserted. Also, the movement of the upper die through these longer strokes magnifies the shock of the upper die 3 in punching the film carrier, thereby vibrating the stamping device 10. This vibration results in improperly positioning leadwires (not shown) of the punched out electronic components relative to the electrodes of a display panel of liquid crystal. Hence, the conventional process illustrated in FIGS. 8(a)–8(c) creates the problem of making it more difficult to connect the leadwires of the electronic components to the electrodes of, for example, a display panel of liquid crystal.

In addition, the conventional process can misalign the electronic component with respect to the take out nozzle, as shown in FIG. 9.

FIG. 9 shows the knock-out pin 6 raised with the punched electronic component 7 on top. As shown in the FIG. 9, burrs E1 and E2 often occur in opposite directions with each other at the edges of the film carrier 1 as the number of punchings or stampings increases. The interference between the extended burrs E1 and E2, when the knock-out pin 6 rises through a punched hole of the film carrier 1 as shown in FIG. 8(c) sometimes moves the electronic component 7 out of place, as shown with a broken line in FIG. 9. This position deviation interferes with the take out nozzle 9 to suck up the electronic component 7 at a proper position. Hence, the conventional process creates the additional problem of making it difficult to remove the electronic component once it has been stamped out.

The present invention, as described hereinafter, provides a mounting or fabricating device which solves the above problems created by the conventional process described above.

SUMMARY OF THE INVENTION

According to this invention, a mounting device is provided, which mounts electronic components, stamped out from film carriers, to a substrate. The mounting device of this invention comprises:

1. a supplying means of film carriers having electronic components on it,
2. a holding means for holding a substrate,
3. a punching means for punching out electronic components on the film carriers comprising:
   a) an upper die,
   b) a lower die having a through hole, wherein the upper die punches electronic components on the film carriers into the through hole,
4. a take out means for taking out the punched electronic components through a bottom of the through hole and for transmitting them to a transferring means,
5. a transfer means for transferring the electronic components transmitted with the take-out means to mounting positions adjacent said holding means, and
6. a pressure bonding means for pressure bonding leadwires of the electronic components to electrodes of a substrate.

In addition, according to the present invention, a process for mounting electronic components, stamped out from a film carrier, to a substrate is provided. The process comprises the following steps:

1. adjusting the position of a film carrier having electronic components thereon to a punching means,
2. punching out an electronic component bonded on the film carrier,
3. taking out the punched out electronic component through a bottom of said punching means and transmitting the electronic component to a transfer means by the take out means,
4. using the transfer means to transfer the transmitted electronic component to a mounting position, and
5. pressure bonding leadwires of the electronic component with electrodes of the substrate at said mounting position.

As pointed out in greater detail below, taking out the punched out electronic components through the bottom of a punching means rather than from a space between the upper and lower die of a punching means provides important advantages. For example, the electronic components will be in the proper position when being removed for transfer to the mounting position. In addition, the punching means uses shorter strokes since the electronic component take out means does not have to be inserted in between upper and lower dies. As a result, the punching means of this invention uses shorter strokes than the conventional dies and causes less vibration. Hence, the present invention provides an important benefit of properly aligning or positioning the leadwires of the punched out electronic components with the electrodes of the substrate to which the leadwires are being connected.

The invention itself, together with further objects and attendant advantages, will best be understood by reference to the following detailed description taken in conjunction with the accompanying drawings.

DETAILED DESCRIPTION OF THE INVENTION

First Embodiment

FIGS. 1–4 show a mounting or fabricating device according to a first embodiment of this invention.

First, the structure for punching out and taking out or removing the electronic components is explained.

Figure 1:
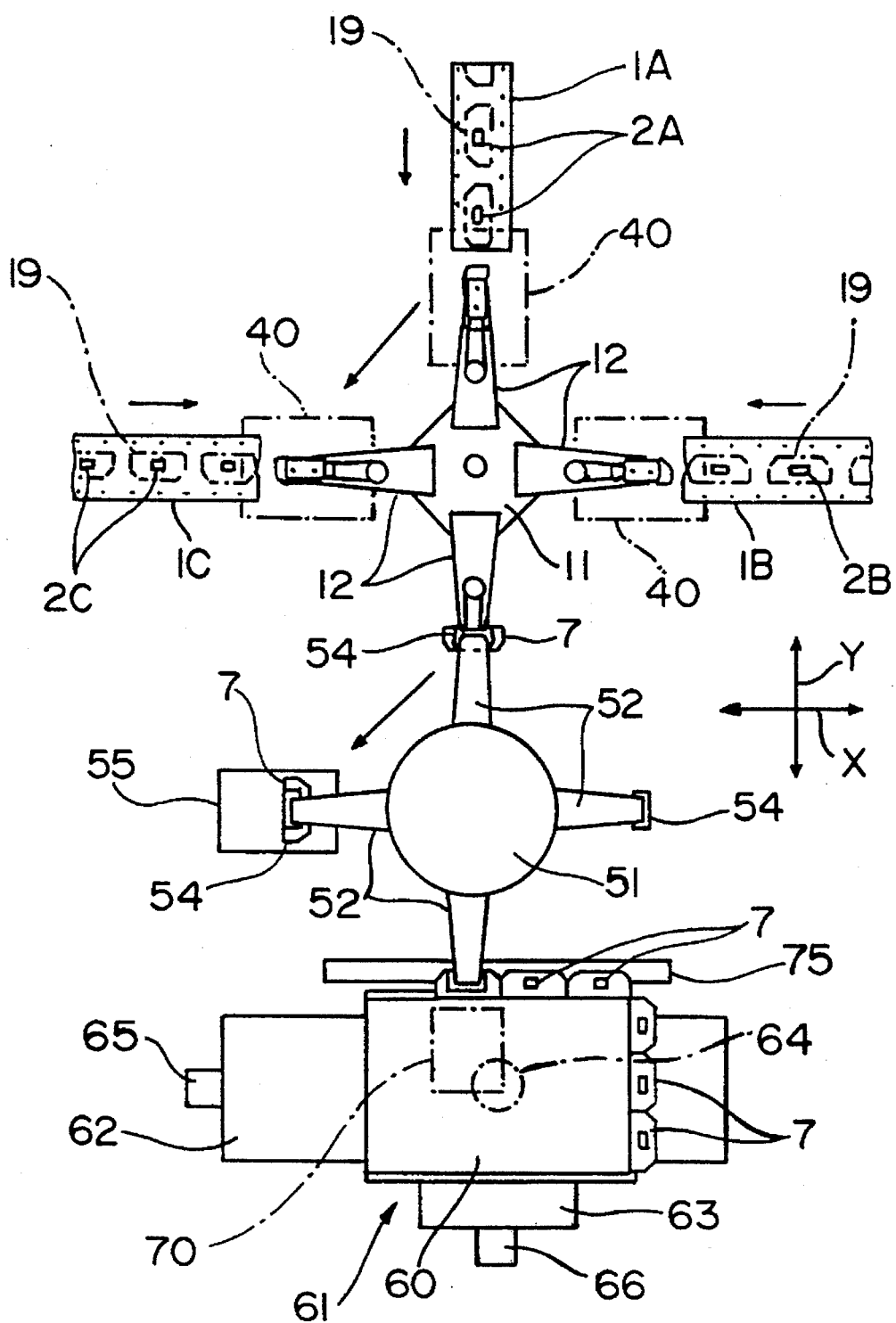
FIG. 1 is a top view of a punching, take out and mounting device according to the first embodiment of this invention.
Figure 2:
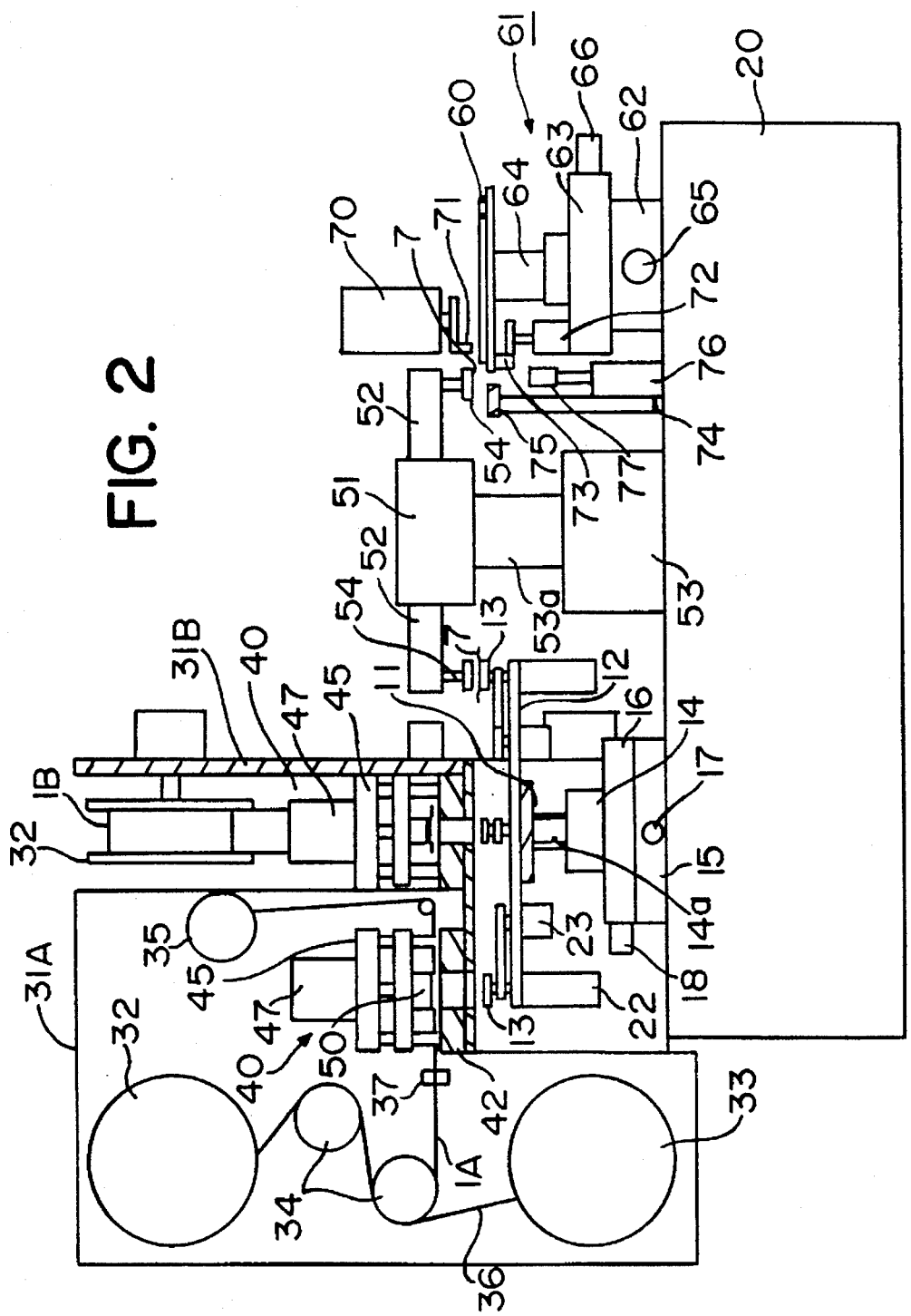
FIG. 2 is a side view of the first embodiment shown in FIG. 1.
Figure 3:
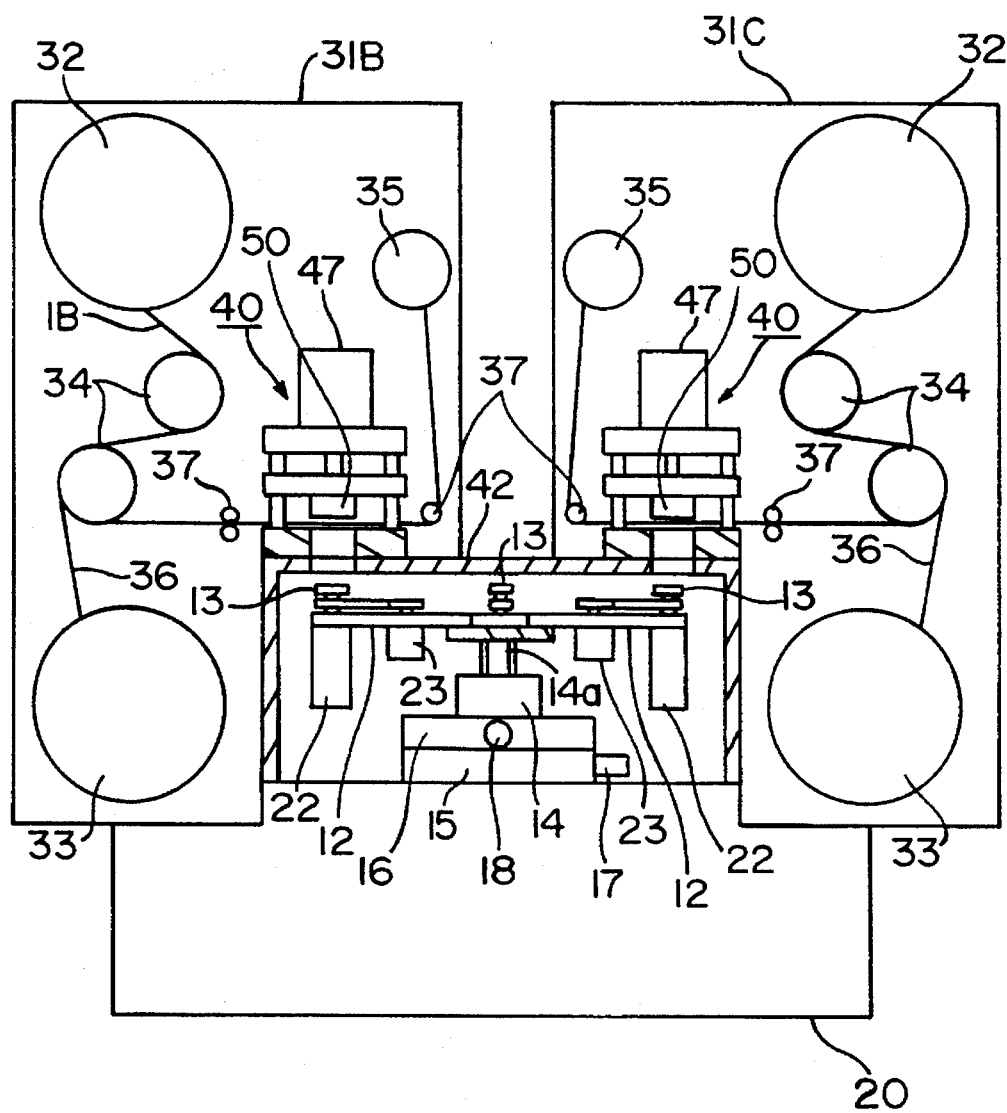
FIG. 3 shows a plurality of boards for feeding carrier films to a punching device according to this invention.
Figure 4A:
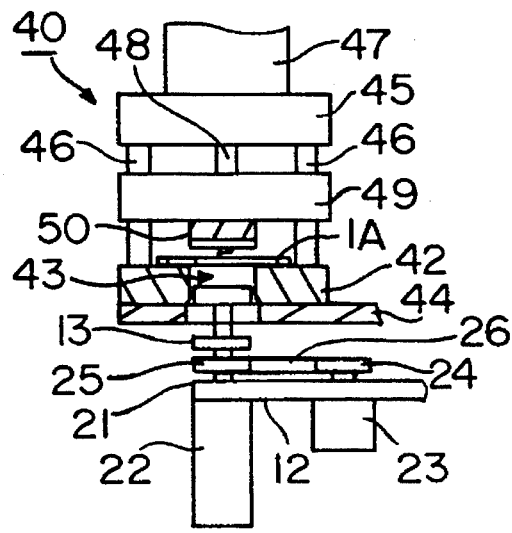
FIGS. 4(a)–4(c) show side views of the punching and take out devices according to the invention.

In FIG. 1, the take out means 11 has a plurality of arms 12. As shown in FIGS. 2 and 3, the take out means is fixed to a shaft 14a, and each arm 12 has a take out nozzle 13 on each tip. The take out means 11 is driven by an index driver 14 and rotates together with the shaft 14a. The index driver 14 is placed on X-table 15 and Y-table 16. The tables, X-table 15 and Y-table 16, are mounted on a base 20. Motors, identified as X-table motor 17 and Y-table motor 18, drive the X-table in the X direction and Y-table in the Y direction, respectively. Thus, the location of the take out means 11 is adjustable by moving the X-table 15 and the Y-table FIG. 4(a) shows the punching means 40 and a tip of the arm 12. A lower die 42 has a through hole 43. An upper die 49 has a guide rod 46, which guides the up and down movement of the upper die 49. The upper die 49 has a punch 50, and is coupled to a rod 48 of a cylinder 47. A cylinder 22 is fixed to the tip of the arm 12. At the tip of said cylinder 22 is a nozzle shaft 21, which is driven by the cylinder 22 to move the shaft 21 up and down. The take out nozzle 13 is mounted on the nozzle shaft 21 with a sucking side face up. The broken line shows an upper specific position of the take out nozzle 13 and the solid line shows a lower specific position.

Figure 4B:
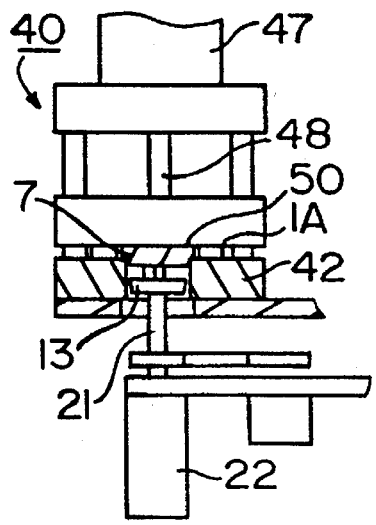

As shown in FIG. 4(b), the upper die 49 punches a film carrier 1A to stamp out an electronic component 7 by means of the downward movement of the rod 48. The take out nozzle 13 sucks up the stamped out electronic component 7 at the upper specific position.

Figure 4C:
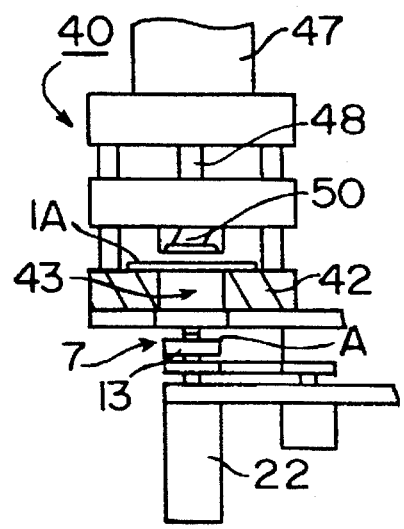

As shown in FIG. 4(c), the upper die 49 is returned upward by means of the upward movement of the rod 48. The take out nozzle 13, which sucked the electronic component 7, goes down to the lower specific position.

Thus, the stamped out electronic component 7 is taken out through the bottom of the through hole 43 of the lower die 42. After the component is taken out, the arm 12 rotates to move the take out nozzle 13 (out of FIG. 4) and transmit the stamped out electronic component 7 to a transferring nozzle (explained hereinafter).

An electric motor 23 rotates the nozzle shaft 21 via pulleys 24 and 25 and a belt 26 in order to adjust an angular position of the electronic component 7 sucked up by the take out nozzle 13.

Turning back to FIG. 1, the description of the process of punching out a plurality of electronic components follows. Film carriers 1A, 1B and 1C having sprocket holes on both edges, are fed to the tip of each arm 12 of the take out means 11. Electronic components 2A, 2B and 2C, bonded on the film carriers 1A, 1B and 1C, respectively, are stamped out by a punching means 40, as described with respect to FIGS. 4(a)–4(c), along a punch-guide-line 19. A punching means 40 is provided for each film carrier. The electronic components 2A, 2B, 2C may be identical ones or different ones.

Next, the structure for feeding the film carriers to the punching means is explained.

FIG. 2 shows a board 31A having a film carrier 1A being supplied to the punching means 40 via a supply reel 32, a guide roller 34 and a pair of sprockets 37. The sprockets 37 are engaged with the sprocket holes on the film carrier 1A to feed the film carrier 1A intermittently to the punching means 40. At the same time, the sprocket 37 controls the amount of film carrier 1A supplied to the punching means in order to locate or position the film carrier 1A properly, relative to the punching means 40. A reel 33 takes up a separate tape backing from the film carriers, while a reel 35 takes up the film carrier after the punching of an electronic component is completed. Each reel is driven by a driving device not shown in FIG. 2. In FIG. 3, boards 31B and 31C, having the same structure as the board 31A, feed film carriers 1B and 1C to respective punching means 40.

Next, the structure, for transferring the electronic components from the take out nozzle 13 and connecting the leadwires of an electronic component and the electrodes of a substrate, is explained.

The top view of a transfer means 51 is shown in FIG. 1.

As shown in FIG. 1, transfer nozzles 54 are provided on the tip of each arm 52 of the transfer means 51. The transfer nozzles 54 are driven by a built-in driving means (not shown) and move up and down.

Next, as shown in FIG. 2, the transfer means 51 is fixed on a shaft 53a. The transfer nozzle 54 is driven by an index driver 53 to rotate together with the shaft 53a. The movement of the transfer nozzle 54 is mainly an intermittent rotation by an angle of 90°. An intersection is found between a locus of the take out nozzle 13 and a locus of the transfer nozzle 54. As shown in FIG. 2, at this intersection (hereinafter called the transfer point), the take out nozzle 13 and the transfer nozzle 54 overlap each other, and the electronic component 7 is transferred from the take out nozzle 13 to the transfer nozzle 54. To be more specific, the take out nozzle 13 loses its sucking power due to being cut off from a vacuum source, while the transfer nozzle 54 is coupled to the vacuum source and gains sucking power. As a result, the electronic component 7 is sucked by the transfer nozzle 54 away from the take out nozzle 13. In FIGS. 1 and 2, the transferred electronic component 7 is shifted or rotated from the transfer point to a place above a mounting point 180° away from the transfer point to a mounting point. The transfer nozzle 54 is lowered as the electronic component 7 arrives at the mounting point. At the mounting point, the leadwires (not shown) of the electronic component 7 are placed over the electrodes of a substrate such as, for example, a liquid crystal display panel 60. The leadwires and electrodes are separated by an anisotropic conductive film between them, which film is stuck on the electrodes for connecting the electrodes to the leadwires. These two elements are pressure bonded through pressure and heat provided by a thermal bonding head 71.

As shown in FIGS. 1 and 2, each electronic component 7 is mounted on the periphery of the liquid crystal display panel 60 placed on a movable table 61. The movable table 61 can adjust the position of a substrate such as the display panel 60 in the directions of X, Y and O (rotation). The thermal bonding head 71, which pressure bonds the leadwires of electronic component 7 with the electrodes of the display panel 60 is mounted at the tip of a bonding means 70. During the thermal pressure bonding, a supporting material 73, supported by the cylinder 72, supports the bottom of display panel 60. On the other hand, a supporting material 75 on the rod 74 is used to support a lower face of the electronic component 7 at the mounting point. A monitor camera 55 (FIG. 1) detects the position of electronic component 7 sucked to the transfer nozzle 54. According to the position detected by the camera, the movable table 61 can make a rough adjustment of the position of display panel 60. Another camera 77 detects any misalignments between the leadwires of electronic component 7 and the electrodes of the display panel 60. According to the results of the detection by camera 77, the movable table 61 can make a fine adjustment of the position of the display panel 60, so that the leadwires of the electronic component 7 can be exactly mounted relative to the electrodes of the panel.

Figure 5:
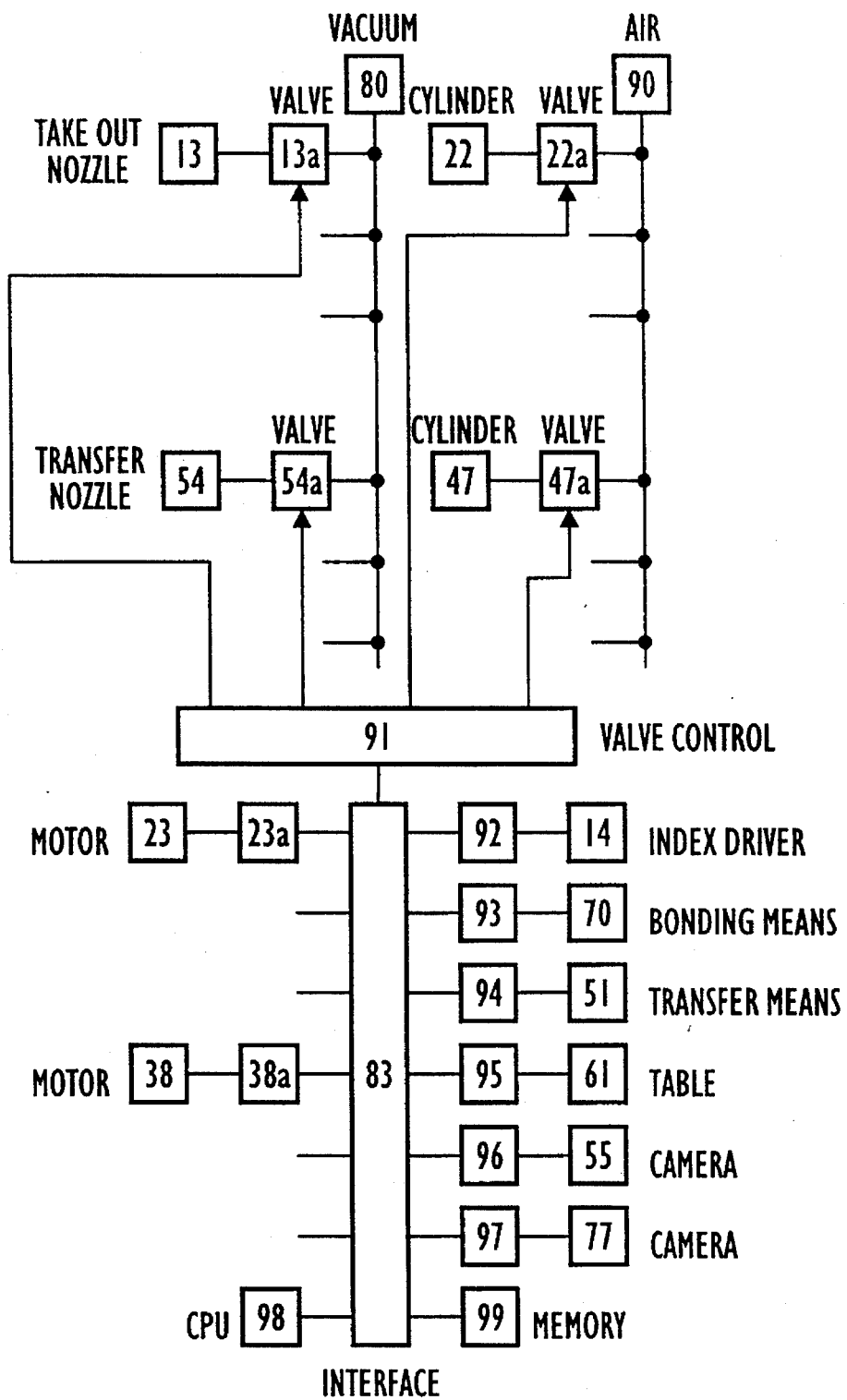
FIG. 5 shows a control system for the mounting device of this invention.

Next, the control system, as illustrated in FIG. 5, is described.

The sucking action on an electronic component as well as the releasing of the component by the take out nozzle 13 and the transfer nozzle 54 is controlled through the opening and shutting of the vacuum source 80 by a valve 13a and a valve 54a. The driving of the cylinder 22, which drives the take out nozzle 13 up and down, is controlled through the opening and shutting of a high-pressured-air source 90. A double-acting cylinder 47, which drives the punch 50 of a punching device, is controlled by switching the air-supply-direction of the high-pressured-air source 90 by a valve 47a. A valve control circuit 91 controls the valves 13a, 54a, 22a and 47a independently with commands from a central processing unit (CPU) 98.

An electric motor drive-circuit 23a controls an electric motor 23, which adjusts the angular position of the take out nozzle 13. An electric motor drive-circuit 38a controls an electric motor 38, which drives the sprocket 37. An index drive-circuit 92 controls an index driver 14. A pressure bonding means drive-circuit 93 controls a press-fit means 70. A transfer means control-circuit 94 controls a transfer means 51. A movable table control-circuit 95 controls the movable table 61. All these control circuits receive commands from the CPU 98 through an interface 83. Recognition circuits 96 and 97 feed the position information, detected through the monitor cameras 55 and 77 about the electronic component 7 sucked to the transfer nozzle 54, and positioned on the table 61 to the CPU 98. The CPU 98 controls the entire device according to a program and data stored in the memory 99.

Next, the entire process of the present invention is explained by describing the steps from feeding and punching out an electronic component from a film carrier to the mounting of the electronic component to a substrate, such as a display panel of liquid crystal. These steps are as follows:

STEP 1: A selected take out nozzle 13, which does not have the electronic component 7, is placed at a lower specific position.

STEP 2: A film carrier is fed or inserted between the punch 50 and the lower die 42, driven by the sprocket 37. The position of a film carrier is preadjusted so that the electronic component 7 being stamped out is positioned just above the through hole 43.

STEP 3: The take out nozzle 13 rises to the upper specific position.

STEP 4: The valve 13a is opened to provide the take out nozzle 13 with a vacuum to permit the nozzle to suck out the component.

STEP 5: The punch 50 is lowered and the electronic component 7 is stamped out from the film carrier. The electronic component 7, after being stamped out, is sucked to the take out nozzle 13.

STEP 6: The punch 50 is raised.

STEP 7: The take out nozzle 13, which is still sucking the electronic component 7 is lowered to the lower specific position.

STEP 8: The take out means 11 is rotated and the take out nozzle 13, which is still sucking the electronic component 7, is moved to the transfer point.

STEP 9: The transfer means 51 is rotated and the transfer nozzle 54, which is commanded to receive the electronic component 7, is moved to the transfer point.

STEP 10: At the transfer point, the lowered transfer nozzle 54 is moved close to the electronic component 7. The valve 54a is opened to provide the transfer nozzle 54 with a vacuum to permit the nozzle 54 to suck up the component.

STEP 11: The valve 13a is shut off, causing the take out nozzle 13 to lose its vacuum sucking power. As a result, the electronic component 7 is transferred from the take out nozzle 13 to the transfer nozzle 54.

STEP 12: The transfer nozzle 54, which is sucking the electronic component 7, is raised.

STEP 13: A transfer means 51 is rotated and the transfer nozzle 54, which is still sucking the electronic component 7, is moved toward the mounting point.

STEP 14: The camera 55 detects the position of the electronic component 7 sucked to the transfer nozzle 54.

STEP 15: The movable table 61 makes a rough adjustment of the display panel 60 according to the position detected by the camera 55 in STEP 14.

STEP 16: The transfer nozzle 54, which is still sucking the electronic component 7, is positioned above the mounting point.

STEP 17: The camera 77 detects the positional difference between leadwires of the electronic component 7 and electrodes of the display panel 60.

STEP 18: The movable table 61 makes a fine positioning adjustment of the display panel 60, so that the above positional difference may become zero.

STEP 19: The transfer nozzle 54 which is still sucking the electronic component 7, is lowered to position the electronic component 7 at the mounting point.

STEP 20: A thermal bonding head 71 is lowered to bond the leadwires of the electronic component 7 with the electrodes of the liquid crystal display panel by thermal pressure bonding.

STEP 21: After the thermal compression, the valve 54 is shut off causing the transfer nozzle 54 to lose its vacuum sucking power.

STEP 22: The transfer nozzle 54 is raised.

STEP 23: The movable table 61 is moved to position a display panel for the mounting of the next electronic component at the mounting point.

Second Embodiment

Figure 6:
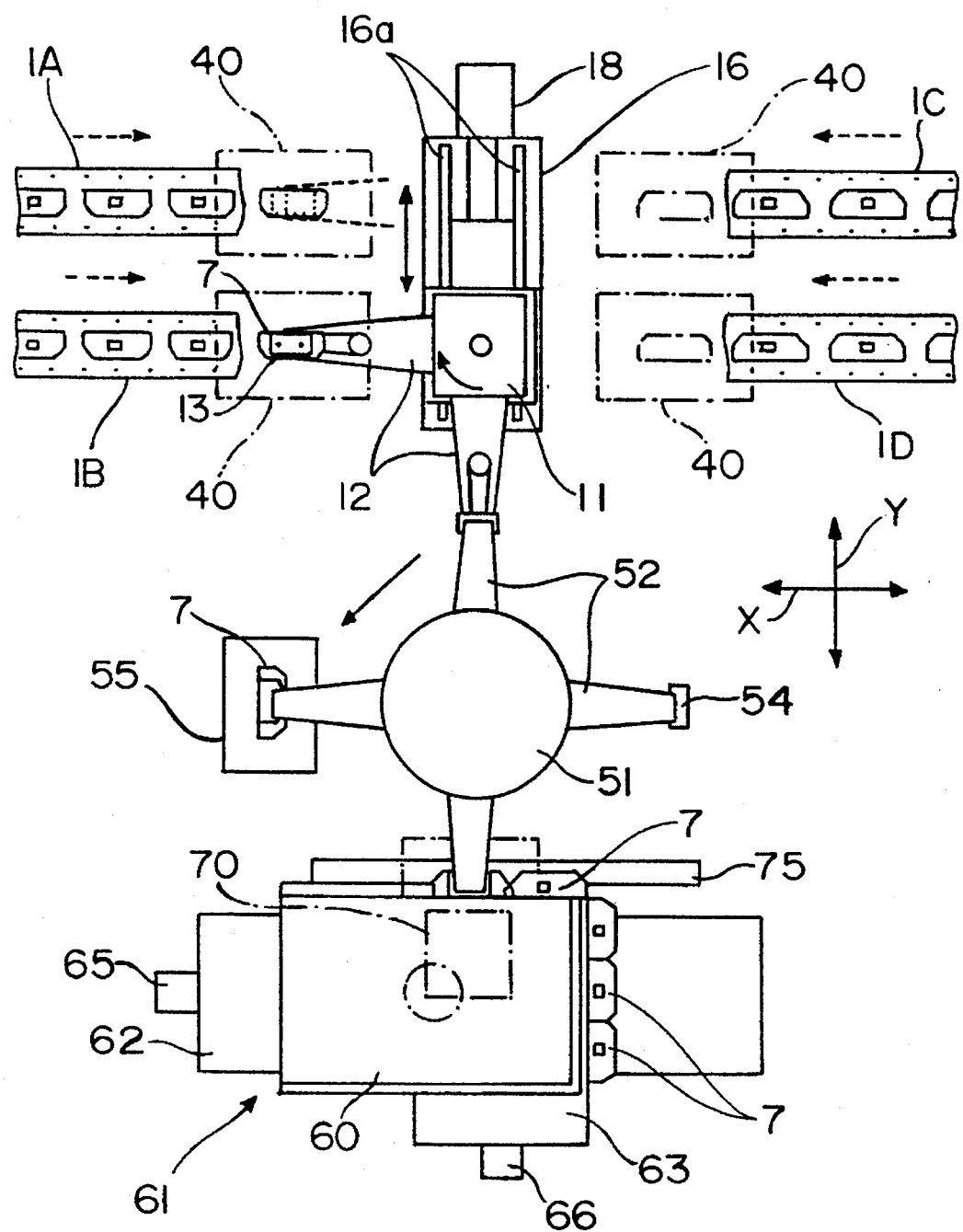
FIG. 6 is a top view of a punching and take out device according to a second embodiment of this invention.

FIG. 6 shows a second embodiment of this invention. A take out means 11 having an arm 12 is placed on a table 16 movable in the Y-direction. The arm 12 is rotatable, as well as movable along the Y direction. A guiding means 16a guides the movement of the take out means 11. Two punching devices 40 are placed at each side of the Y-table 16. Specifically, a total of four punching devices are used. Film carriers 1A, 1B, 1C and 1D are fed to respective punching devices 40. The take out nozzle 13 selects a film carrier by rotation and movement along the Y direction, and takes out the electronic component 7 through the bottom of the through hole of the lower die of the punching device 40. The remaining steps in the process are the same as those described under the first embodiment.

Third Embodiment

Figure 7:
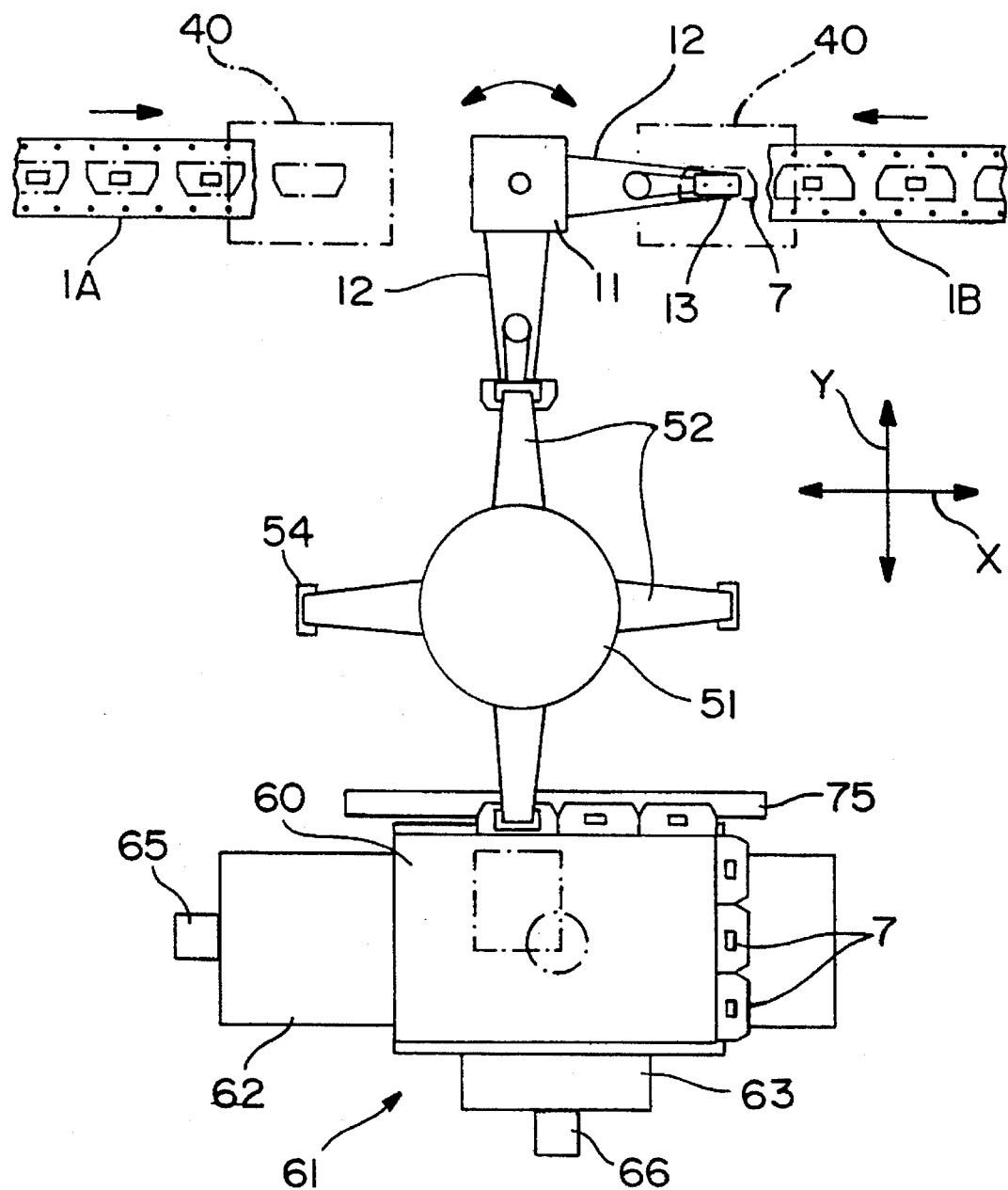
FIG. 7 is a top view of a punching and take out device according to a third embodiment of this invention.
Figure 8A:
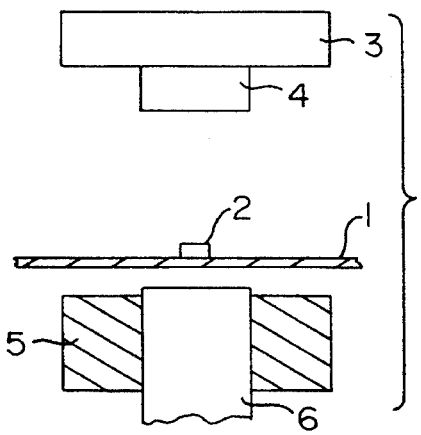
FIGS. 8(a)–8(c) show a conventional punching and take out device.
Figure 8B:
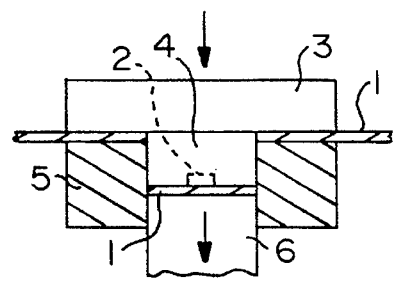
Figure 8C:
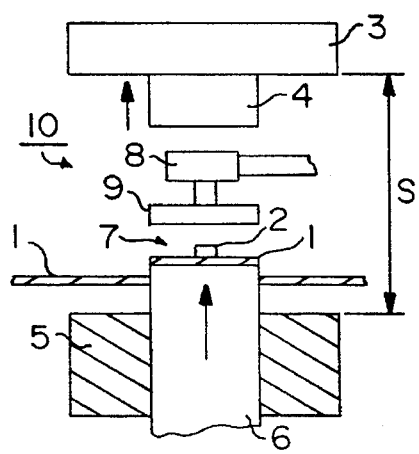
Figure 9:
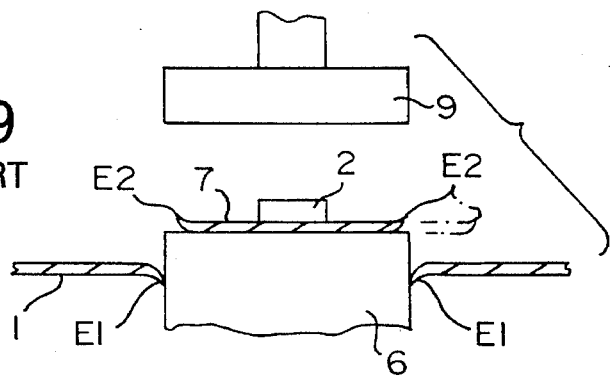
FIG. 9 shows the problems with a conventional punching and take out device.

FIG. 7 shows a third embodiment of this invention. A take out means 11 has an arm 12 that is only rotatable. A punching device 40 is placed at each side of the take out means. Film carriers 1A and 1B are fed respectively, to each punching device 40. The take out nozzle 13 selects a film carrier by rotation, and takes out an electronic component 7 through the bottom of the through hole of the lower die of the punching device. 40. The remaining steps in the process are the same as described under the first embodiment.

Advantages

As explained above, the take out means of this invention takes out an electronic component through the bottom through hole of the lower die. This method offers the following advantages over the conventional process of stamping out components and pushing them up to a take out nozzle placed between a pair of dies, which dies have to be spaced sufficiently enough apart to accept the take out nozzle:

1. The interference between burrs E1 and E2 that occurred by the conventional process described above does not occur in the present invention, since the punched electronic component is not raised through the punched hole of the film carrier. As a result, the take out nozzle of the present invention sucks an electronic component from a proper position since the likelihood that an electronic component may be moved from its proper position is reduced.

2. The take out nozzle of the present invention is not inserted between the upper and lower dies, and hence, the punching device of the present invention uses shorter strokes than the conventional punch. As a result, vibration of the mounting device is reduced and the leadwires of the electronic component are more likely to remain properly aligned to achieve a high precision in connecting the leadwires of an electronic component to the electrodes of a substrate.

3. The shorter strokes taken by the punching device of the present invention shorten the fabrication time of the process.

4. Since the punching device of the present invention neither has knock-out pins nor a machine in which knock-out pins move up and down, the punching device can be of a smaller size than the conventional device.

5. Also the use of a plurality of punching devices according to the present invention reduces wasted time in the process, since immediately after the electronic components are punched from a film carrier, another punching device can punch out electronic components from another film carrier and feed the electronic components to have their leadwires bonded. The present invention has the advantage of providing a continuous process.

Of course, it should be understood that a wide range of changes and modifications can be made to the preferred embodiment described above. It is therefore intended that the foregoing detailed description be understood that it is the following claims, including all equivalents, which are intended to define the scope of this invention.

What is claimed is:

1. A mounting device for electronic components being punched out from a film carrier comprising:

a supplying means for supplying film carriers having electronic components on said film carriers, a substrate holding means for holding substrates, a punching means for punching out the electronic component on said film carrier having an upper die and a lower die having a through hole, wherein said upper die is for punching out the electronic component into said through hole, a take out means for taking out the punched out electronic component through a bottom of said through hole and for transmitting said punched out electronic component to a transfer means;

a transfer means for transferring an electronic component from said take out means to a mounting position adjacent said substrate holding means, and a pressure bonding means for pressure bonding leadwires of an electronic component and electrodes of the substrate.

2. The mounting device of claim 1, wherein said pressure bonding means has a thermal bonding head for bonding the leadwires of the electronic component to the electrodes of the substrate.

3. The mounting device of claim 1, wherein said take out means has a take out nozzle for vacuum sucking the electronic components, and said transfer means has a transfer nozzle for vacuum sucking of the electronic components from said take out nozzle.

4. The mounting device of claim 3, wherein said take out nozzle has a vacuum sucking side face up relative to the electronic component.

5. The mounting device of claim 3, wherein said take out means further comprises:

a supporting shaft for supporting said take out means, an arm rotatable around said supporting shaft, wherein said take out nozzle is mounted on the tip of said arm, a driving means for rotating said arm around said supporting shaft, and a driving means for moving said take out nozzle at right angles to said arm.

6. The mounting device of claim 5, wherein said take out means further comprising a means for moving said supporting shaft.

7. The mounting device of claim 3, wherein said transfer means further comprises:

a supporting shaft for supporting said transfer means, an arm rotatable around said shaft, wherein said transfer nozzle is mounted on the tip of said arm, a driving means for rotating said arm around said support shaft, and a driving means for moving said transfer nozzle at right angles to said arm.

8. The mounting device of claim 1, wherein said supplying means of film carriers comprises an adjusting means for adjusting a position of said film carriers relative to said punching means.

9. The mounting device according to claim 3, further comprising a detection means for detecting a position of the electronic component held by said transfer means.

10. The mounting device according to claim 9, wherein the substrate holding means includes means for adjusting a position of a substrate appropriately for electrical coupling between the electronic component and the substrate according to the detected position of the electronic component detected by said detecting means.

11. A mounting method for mounting an electronic component punched out from a film carrier to a substrate comprising the steps of:

(a) adjusting a position of a film carrier having electronic components bonded thereon relative to a punching means, (b) punching out an electronic component bonded on said film carrier, (c) taking the punched out electronic component out through the bottom of said punching means, (d) transferring the taken out electronic component to a mounting point on a substrate, and (e) pressure bonding leadwires of the electronic component with electrodes of the substrate.

12. A mounting method for mounting an electronic component punched out from a film carrier to a substrate comprising the steps of:

(a) adjusting a position of a film carrier having electronic components bonded thereon relative to a punching means, (b) punching out an electronic component bonded on said film carrier, (c) taking the punched out electronic component out through the bottom of said punching means, (d) transferring the taken out electronic component toward a mounting point on said substrate, (e) detecting a position of the electronic component being transferred to said substrate, (f) adjusting a position of the substrate appropriately for electrical coupling of the electronic component and the substrate, said position being adjusted according to the detected position of the electronic component, (g) lowering the electronic component to said mounting point, and (h) pressure bonding leadwires of the electronic component with electrodes of the substrate at said mounting point.

* * * * *

(12) REEXAMINATION CERTIFICATE (4582nd)

United States Patent
Onitsuka

(10) Number: US 5,501,005 C1
(45) Certificate Issued: May 28, 2002

(54) MOUNTING DEVICE OF ELECTRONIC COMPONENTS AND A MOUNTING METHOD

(75) Inventor: Yasuto Onitsuka, Fukuoka (JP)

(73) Assignee: Matsushita Electric Industrial Co., Ltd., Kadoma (JP)

Reexamination Request:
No. 90/005,837, Oct. 2, 2000

Reexamination Certificate for:
Patent No.: 5,501,005
Issued: Mar. 26, 1996
Appl. No.: 08/313,595
Filed: Sep. 29, 1994

(30) Foreign Application Priority Data

Sep. 30, 1993 (JP) ............................. 5-244539

(51) Int. Cl.$^7$ ............................. H05K 3/30; H05K 3/34; B23P 19/00; G07F 11/66
(52) U.S. Cl. ............................. 29/833; 29/832; 29/840; 29/721; 29/741; 29/759; 29/564.2; 29/566.1; 221/25; 221/74
(58) Field of Search ............................. 29/833, 832, 840, 29/721, 741, 759, 564.2, 566.1, 566.2, 566.3, 564.7; 221/25, 30, 74

(56) References Cited

FOREIGN PATENT DOCUMENTS

| JP | 52-105779 | 9/1977 |
|----|-----------|--------|
| JP | 54-27366 | 3/1979 |
| JP | 2-12025 | 3/1990 |
| JP | 2-133948 | 5/1990 |
| JP | 2-226739 | 9/1990 |
| JP | 2-294047 | 12/1990 |
| JP | 3-21117 | 3/1991 |
| JP | 5-235105 | 9/1993 |

*Primary Examiner*—Carl J. Arbes

(57) ABSTRACT

In an apparatus for mounting electronic components, punched out from film carriers to a substrate, there is disclosed an upper die for punching the electronic components through a hole formed in a lower die. A take out nozzle is located under the through hole for sucking the punched out electronic component from the hole in the lower die. A transfer nozzle is provided for receiving the electronic component from the take out nozzle and for transmitting the electronic component to a substrate mounted on a movable table. Before any leadwires of the component are bonded to the electrodes of the substrate, the table is finely positioned to property align the leadwires and the electrodes.

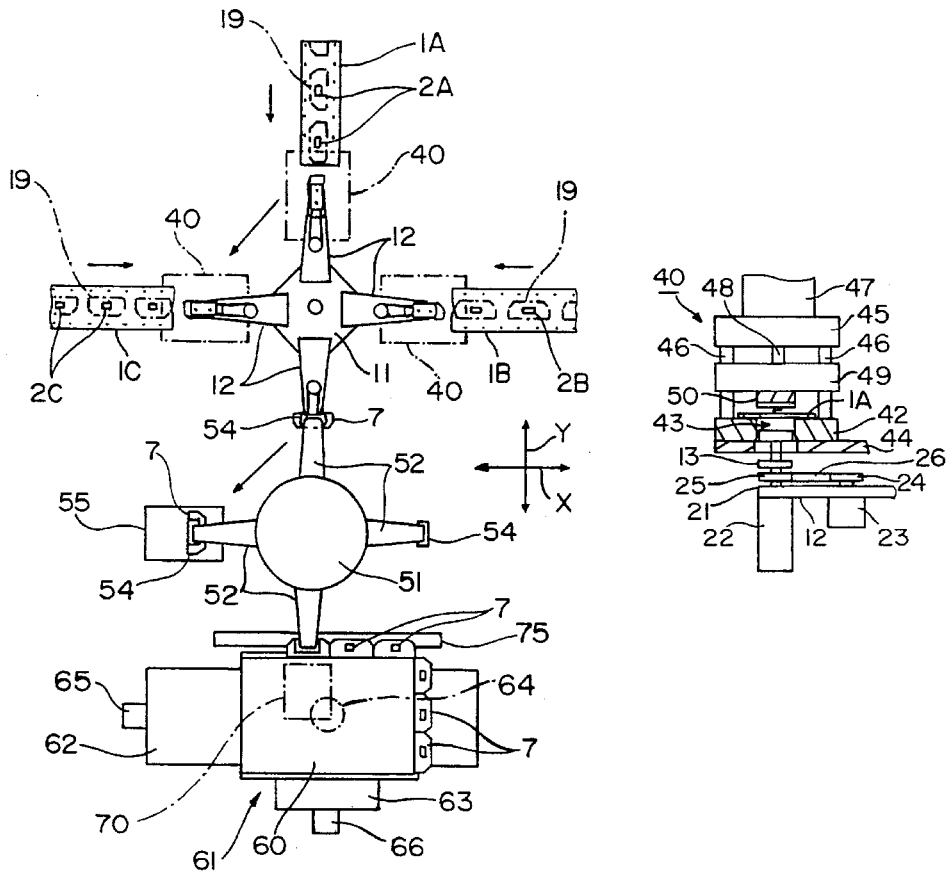

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–10 is confirmed.

Claim 12 is cancelled.

Claim 11 is determined to be patentable as amended.

New claims 13–34 are added and determined to be patentable.

11. A mounting method for mounting an electronic component punched out from a film carrier to a substrate comprising the steps of:
   (a) adjusting a position of a film carrier having electronic components bonded thereon relative to a punching means,
   (b) punching out an electronic component bonded on said film carrier,
   (c) taking the punched out electronic component out through the bottom of said punching means,
   (d) transferring the taken out electronic component to a mounting point on a substrate, *said mounting point being located in an area other than the area located below the bottom of said punching means*, and
   (e) pressure bonding leadwires of the electronic component with electrodes of the substrate.

*13. A mounting method for mounting an electronic component punched out from a film carrier to a substrate comprising the steps of:*
   *(a) adjusting a position of a film carrier having electronic components bonded thereon relative to a punching means,*
   *(b) punching out an electronic component bonded on said film carrier,*
   *(c) taking the punched out electronic component out through the bottom of said punching means by vacuum sucking a bottom face of the electronic component,*
   *(d) transferring the taken out electronic component to a mounting point on a substrate by vacuum sucking a top face of the electronic component, and*
   *(e) pressure bonding lead wires of the electronic component with electrodes of the substrate.*

*14. The mounting method of claim 11, wherein the substrate is a display panel.*
   *15. The mounting method of claim 11, wherein said through hole and said mounting position are not aligned in a vertical direction.*
   *16. The mounting method of claim 13, wherein the substrate is a display panel.*
   *17. The mounting method of claim 13, wherein said through hole and said mounting position are not aligned in a vertical direction.*
   *18. The mounting device of claim 1, wherein said mounting point is located in an area other than the area located below the bottom of said through hole.*
   *19. The mounting device of claim 1, wherein the take out means takes out the punched out electronic component by vacuum sucking the bottom face of the electronic component and the transfer means transfers the electronic component by vacuum sucking the top face of the electronic component.*
   *20. The mounting device of claim 1, wherein the substrates are display panels.*
   *21. The mounting device of claim 1, wherein said through hole and said mounting position are not aligned in a vertical direction.*
   *22. The mounting device of claim 1, wherein said substrate holding means is not located directly beneath said through hole.*
   *23. The mounting method of claim 11, wherein said substrate is not located directly beneath and said through hole.*
   *24. The mounting method of claim 13, wherein said substrate is not located directly beneath and said through hole.*
   *25. A mounting device for electronic components being punched out from a film carrier comprising:*
   *a supplying means for supplying film carriers having electronic components on said film carriers;*
   *a substrate holding means for holding substrates, said substrates being display panels;*
   *a punching means for punching out the electronic component on said film carrier having an upper die and a lower die having a through hole, wherein said upper die is for punching out the electronic component into said through hole,*
   *a take out means for taking out the punched out electronic component through a bottom of said through hole and for transmitting said punched out electronic component to a transfer means;*
   *a transfer means for transferring an electronic component from said take out means to a mounting position adjacent said substrate holding means; and*
   *a pressure bonding means for pressure bonding leadwires of an electronic component and electrodes of the substrate, said pressure bonding means comprising a supporting material which supports a periphery of said substrate from a bottom surface of the substrate during the pressure bonding process.*

*26. The mounting device of claim 25, wherein said mounting point is located in an area other than the area located below the bottom of said through hole.*
   *27. The mounting device of claim 25, wherein said through hole and said mounting position are not aligned in a vertical direction.*
   *28. The mounting device of claim 25, whrein said substrate holding means is not located directly beneath said through hole.*
   *29. A mounting method for mounting an electronic component punched out from a film carrier to a substrate comprising the steps of:*
   *(a) adjusting a position of a film carrier having electronic components bonded thereon relative to a punching means,*
   *(b) punching out an electronic component bonded on said film carrier,*
   *(c) taking the punched out electronic component out through the bottom of said punching means,*
   *(d) transferring the taken out electronic component to a mounting point on a substrate, said mounting point* being located in an area other than the area located below the bottom of said punching means, (e) pressure bonding leadwires of the electronic component with electrodes of the substrate, said substrate being a display panel, and (f) supporting a periphery of said display panel with a supporting material positioned on a bottom surface of said display panel during the pressure bonding process.

30. The mounting method of claim 29, wherein said through hole and said mounting position are not aligned in a vertical direction.

31. The mounting method of claim 29, wherein said substrate is not located directly beneath and said through hole.

32. A mounting method for mounting an electronic component punched out from a film carrier to a substrate comprising the steps of:

(a) adjusting a position of a film carrier having electronic components bonded thereon relative to a punching means, (b) punching out an electronic component bonded on said film carrier, (c) taking the punched out electronic component out through the bottom of said punching means by vacuum sucking a bottom face of the electronic component, (d) transferring the taken out electronic component to a mounting point on a substrate by vacuum sucking a top face of the electronic component, (e) pressure bonding lead wires of the electronic component with electrodes of the substrate, said substrate being a display panel, and (f) supporting a periphery of said display panel with a supporting material positioned on a bottom surface of said display panel during the pressure bonding process.

33. The mounting method of claim 32, wherein said through hole and said mounting position are not aligned in a vertical direction.

34. The mounting method of claim 32, wherein said substrate is not located directly beneath and said through hole.

* * * * *